United States Patent [19]

Brown, Jr.

[11] 4,044,247
[45] Aug. 23, 1977

[54] POLARIZATION REFERENCE IMAGING TECHNIQUE

[75] Inventor: Wilbur P. Brown, Jr., Woodland Hills, Calif.

[73] Assignee: Hughes Aircraft Company, Culver City, Calif.

[21] Appl. No.: 641,329

[22] Filed: Dec. 16, 1975

[51] Int. Cl.² .............................................. H04B 9/00
[52] U.S. Cl. .................................. 250/199; 325/474; 356/4; 356/114
[58] Field of Search .............. 325/474, 475, 476, 371, 325/369; 356/4, 5, 1, 2, 114, 28; 350/153

[56] References Cited

U.S. PATENT DOCUMENTS

3,403,394  9/1968  Rouault ..................................... 343/5
3,576,371  4/1971  Ulicki ....................................... 356/4

*Primary Examiner*—Robert L. Richardson
*Attorney, Agent, or Firm*—Martin E. Gerry; William H. MacAllister, Jr.

[57] ABSTRACT

This disclosure shows a technique used for obtaining high-resolution imagery at infra-red and optical wavelengths in the presence of atmospheric turbulence. The technique uses multi-channel signal processing. Squaring circuits are utilized to obtain the squared functions of the sum and difference frequencies, structured so as to avoid atmospheric turbulent effects upon received signals. This technique is suited for imaging of objects located above the turbulent boundary layer near the earth's surface.

26 Claims, 3 Drawing Figures

POLARIZATION REFERENCE IMAGING TECHNIQUE

BACKGROUND OF THE INVENTION

This invention is in the field of receivers in the infrared and optical frequencies, and particularly those receivers involving high resolution imagery.

Such receivers are generally utilized in detecting objects in space above the turbulent boundary layer near the surface of the earth.

In conventional imaging techniques, the angular resolution capability at infra-red and optical wavelengths is limited by atmospheric turbulence to angles approximately in excess of two arc seconds irrespective of the size of the imaging optics.

Prior art systems consist in part of conventional infrared and optical imaging networks wherein an image is formed by means of a single refracting or reflecting lens system. These systems suffer the disadvantage that they are significantly affected by atmospheric turbulence.

Other prior art systems also suffer from limited detection capabilities due to use of passive radiation from the object sought to be detected. These systems give rise to ambiguities in the images because such systems do not preserve phase information relative the received signals.

SUMMARY OF THE INVENTION

An objective of this invention therefore is to provide a technique so as to enable an increase in image resolution of objects to substantially smaller than the two arc second limit imposed by the prior art.

Still another objective is to provide a technique whereby the atmospheric turbulence component present in prior art systems is eliminated.

Yet a further objective is to provide a system that will not use passive radiation from objects being detected and imaged, will not give rise to image ambiguities, and will preserve phase information in the signals throughout the inventive system.

Briefly, according to this invention, the technique disclosed here is partly based on the fact that when a scatterer is illuminated by a polarized wave the energy scattered with the incident polarization is predominately specular in nature and therefore originates from a localized region on the scatterer whereas the cross-polarized scattered energy is associated with diffuse scattering and therefore comes from all points on the scatterer.

Another fact that is crucial to the technique in terms of space objects is that the effect of the atmospheric turbulence is approximately the same for all points on the scatterer. This occurs because the small angular extent of a space object ensures that the atmospheric path for the return from such objects does not change appreciably as a function of distance.

To obtain information about the scatterer, the depolarized return must be processed in such a manner that the perturbing effect of the atmosphere is removed.

A receiver as shown herein is configured to accomplish the task of removing the perturbing effect of the atmosphere.

The receiver includes a polarizing plate that divides the incoming optical wave into two components consisting of the sum and difference of the polarized and cross-polarized target returns. These optical signals are then heterodyne detected with detectors that utilize a common local oscillator. The signal currents are excited by the components of the polarized and the cross-polarized outputs available from two detectors, are squared, mixed with a signal at the difference frequency, integrated and substracted from the signal at the sum frequency. The output obtained is devoid of the perturbing turbulent component.

An image of the scatterer can be obtained by utilizing a number of receivers of the type shown in the figure herein.

DETAILED DESCRIPTION

Figure 1:
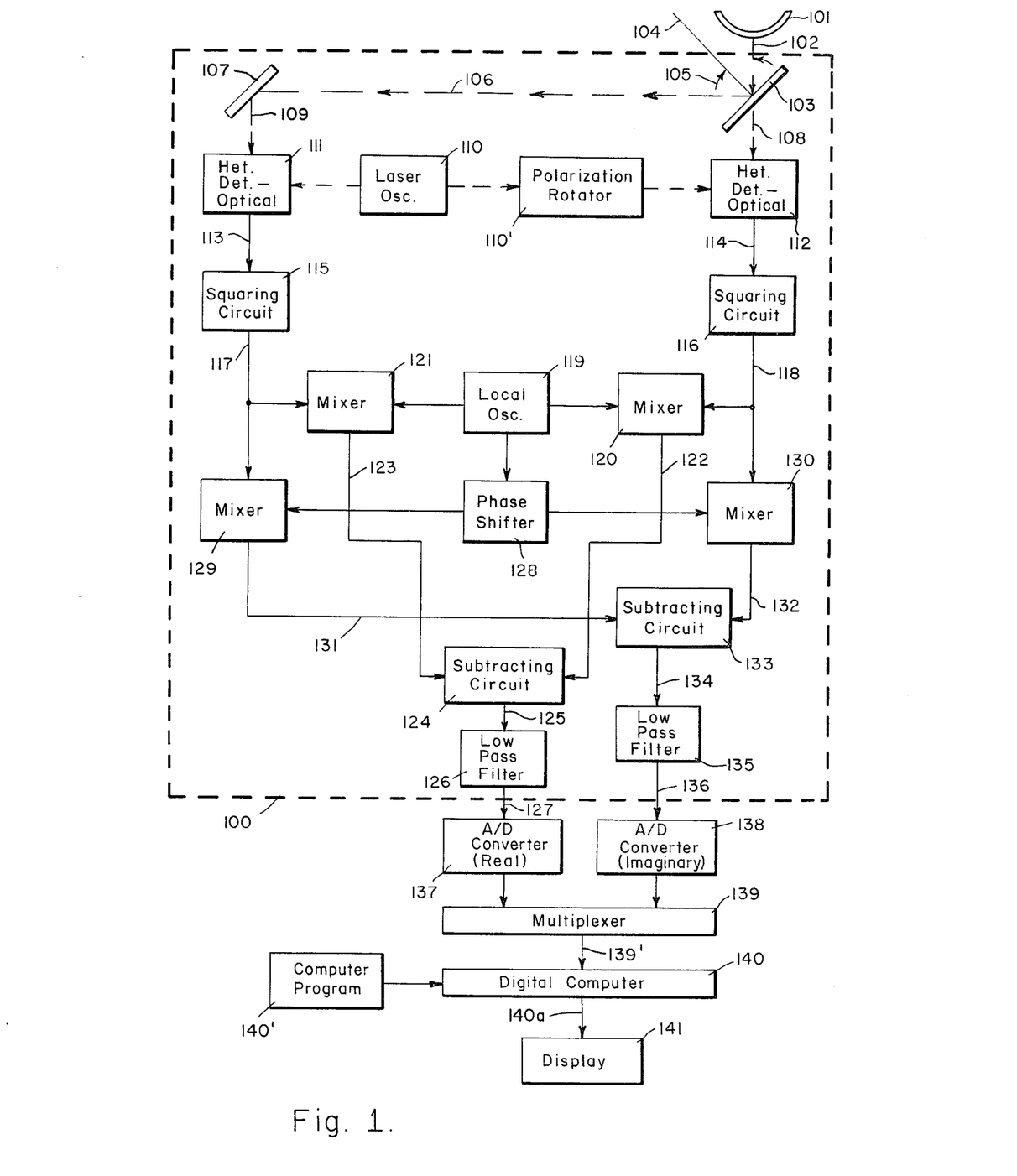
FIG. 1 shows in schematic block format, a special dual channel receiver with coupling between channels, and output computing and display means connected to said structure. The dotted connecting lines between the elements therein constitute electromagnetic coupling, and the solid lines hard wire interconnection between said elements.

Referring to FIG. 1, the inventive receiver is shown at 100. Reception of energy as reflected from a target in the wavelength range of 0.5 $\mu$m to 10 cm, may be received by telescope 101, the optical output of telescope 101 being shown in terms of beam 102 which forms an angle as at 105 with respect to a plane 104 normal to polarizing plate 103.

Optical signal at 102 may be expressed in several formats by equations (1$a$), (1$b$), (2$a$), (2$b$), (5) and (6), as hereinbelow defined.

Briefly, the technique disclosed here is partly based on the fact that when a scatterer is illuminated by a polarized wave, the energy scattered with the incident polarization is predominately specular in nature and therefore originates from a localized region on the scatterer; whereas, the cross-polarized scattered energy is associated with diffuse scattering and therefore comes from all points on the scatterer. This means that if we illuminate a scatterer with laser radiation, the polarized return is proportional to that of a point source at the scatterer, and may be stated as:

$$U_p(x) = e_p u_p(x), \quad (1a)$$

$$u(x)_p = \widetilde{G}(x,x_o), \quad (1b)$$

where $e_p$ is a unit vector in the direction of the polarization of the incident laser light, $x$ is the position of the receiver and $x_o$ is the position of the specular point on the scatterer (we assume that there is only one specular point, or if there are more than one, that one predominates). Likewise, the cross-polarized return may be stated as:

$$U_s(x) = e_s u_s(x), \quad (2a)$$

$$u_s(x) = \int_{x'} dx' \, u(x') \, p(x') \, \widetilde{G}(x,x'), \quad (2b)$$

where the integration is over the surface of the scatterer, $e_s$ is a unit vector transverse to the direction of propagation and orthogonal to $e_p$ (i.e., $e_s = e_p \times e_z$ where $e_z$ is a unit vector in the direction of propagation), $u(x')$ is the laser field incident on the surface, $\rho(x')$ is the diffuse reflectivity of the surface, and G is Green's function for propagation from the point $x'$ on the surface to the point $x$ at the receiver.

Another fact that is crucial to our technique is that for space objects the effect of the atmospheric turbulence on the Green's function $\tilde{G}(x,x')$ in equation (2b) is approximately the same for all points $x'$ on the scatterer. This occurs because the small angular extent of a space object ensures that the atmospheric path for the return from such objects does not change appreciably as a function of $x'$. In effect, this means that the Green's function $\tilde{G}(x,x')$ in equation (2b) may be written in the form:

$$\tilde{G}(x, x') \sim \tilde{G}(x, x_o) \exp\left[ik\frac{(x - x_o)\cdot(x_o - x')}{|x - x_o|}\right], \quad (3)$$

and the cross-polarized return may be written in the form:

$$u_s(x) = \tilde{G}(x, x_o) \exp\left[-ik\frac{(x - x_o)\cdot x_o}{|x - x_o|}\right] \quad (4.)$$

$$\times \int_{x'} dx' \, u(x')\rho(x') \exp\left[-ik\frac{(x - x_o)\cdot x'}{|x - x_o|}\right]$$

Finally, we note that the reference point $x_0$ may be chosen as the origin of coordinates, so that equations (1b) and (4) become:

$$u_p(x) = \tilde{G}(x, 0), \quad (6.)$$

$$u_s(x) = \tilde{G}(x, 0) \int_{x'} dx' \, u(x')\rho(x') \exp\left[-ik\frac{x \cdot x'}{|x|}\right]$$

To obtain information about the scatterer, we must process the cross-polarized return in such a manner that the perturbing effect of the atmosphere, which is contained in the factor $\tilde{G}(x,0)$ in equation (6), is removed. FIG. 1 shows a receiver configuration that accomplishes this task if we illuminate the scatterer with laser radiation consisting of two closely spaced spectral lines at $(\omega_o + \omega_1)$ and $(\omega_o + \omega_2)$ where $\omega_o$ is the frequency of local oscillator 110. Though FIG. 1 shows the best mode contemplated it is nonetheless used for illustrative purposes, since other configurations are possible. For example, we could illuminate the scatterer with laser radiation at $\omega_o$ and use a local oscillator with energy at $(\omega_o + \omega_1)$ and $(\omega_o + \omega_2)$. The polarized and cross-polarized scattered fields from the target are received by the receiving optics such as telescope at 101, and are then reflected from and transmitted through the polarizing plate 103, which has the property that the reflected field at 106 has the polarization $(e_p - e_s)\sqrt{2}$ and the transmitted field at 108 has the polarization $(e_p + e_s)\sqrt{2}$.

Polarizing plate 103 divides the incident light into two linearly polarized parts, one of which is transmitted as at 108, and other is reflected as at 106. The orientation of this plate is chosen so that the polarization of the reflected field is $(e_p - e_s)$ and that of the transmitted field is $(e_p + e_s)$ where $e_p$ and $e_s$ are unit vectors in the direction of the polarized and cross-polarized returns from the target.

The light signal reflected from the polarizing plate at 106 is referred to as the P-S component of the input optical signal, because it is polarized in the direction $e' = (e_p - e_s)$ where $e_p$ and $e_s$ are unit vectors in the direction of the polarized and cross-polarized return from the target.

Signal at 106 impinges upon mirror 107 which is angularly adjustable so as to preset this mirror to reflect light orthogonally with respect to optical surface of detector 111, and such mirror 107 reflects beam 106 as shown at 109 to impinge upon said optical heterodyne detector 111.

The reflected field 106, impinging on mirror 107, may be expressed as:

$$U_{p-s}(x) = \left\{\begin{array}{l}\text{Field Reflected}\\ \text{from the Polarizing Plate (103)}\end{array}\right\} \quad (7)$$

$$= e_{p-s}\{e_{p-s} \cdot [U_p(x) + U_s(x)]\},$$

$$= e_{p-s}[u_p(x) - u_s(x)]/\sqrt{2},$$

where, $$e_{p-s} = \frac{e_p - e_s}{\sqrt{2}} \quad (8).$$

The transmitted field 108 may be expressed as:

$$U_{p+s}(x) = \left\{\begin{array}{l}\text{Field Transmitted through the polarizing Plate (103)}\end{array}\right\} \quad (9)$$

$$= e_{p+s}\{e_{p+s} \cdot [U_p(x) + U_s(x)]\},$$

$$= e_{p+s}[u_p(x) + u_s(x)]/\sqrt{2},$$

where, $$e_{p+s} = \frac{e_p + e_s}{\sqrt{2}} \quad (10).$$

The fields $U_{p-s}(x)$ at 109 and $U_{p+s}(x)$ at 108 are then optically heterodyne detected by detectors 111 and 112 respectively, which detectors utilize a common local oscillator 110 serially interconnected with a ninety degree polarization rotator 110'. The polarization of the local oscillator 110 is preset in the direction $e_{p-s}$, which ensures that it beats efficiently with signal 106 impinging on detector 111. To obtain efficient mixing of signal 108 with the local oscillator field on detector 112, polarization rotator 110' is serially interconnected between oscillator 110 and detector 112. This rotator rotates the $e_{p-s}$ polarization of local oscillator 110 an angle of ninety degrees into the direction $e_{p+s}$.

It is quite possible to obtain the desired results, wherein detectors 111 and 112 are not of the heterodyne types, but are responsive to optical inputs as at 109 and 108 respectively, where no laser oscillator 110 and rotator 110' is employed. Detectors 111 and 112 would have to be carefully tuned to the incoming frequency so as to obtain high sensitivity output therefrom.

Light signal at 108 is transmitted by the polarizing plate. This signal is polarized in a direction perpendicular to 106. It is referred to as the P+S component of the input optical signal because it is polarized in the direction $e' = (e_p + e_s)$ where $e_p$ and $e_s$ are defined as discussed above, and is represented by equation (9), above.

The current output $i_{p-s}$ at 113 of heterodyne detector 111 is represented by equation (12), below, and is proportional to the product of the real part of $$e_{p-s} U_{p-s}(x) (\exp[i(\omega_o+\omega_1)t] + \exp[i(\omega_o+\omega_2)t]), \quad (11)$$

and the argument $\cos(\omega_0 t)$.

Using equation (7) we may obtain:

$$i_{p-s}(x) = \beta |\tilde{G}| \{\cos(k|x| + \phi_{atm}(x) + \omega_1 t) \quad (12)$$

$$- \int dx' |u(x')| \rho(x') |\cos\left(k|x| + \phi_{atm}(x) - k\frac{x \cdot x'}{|x|} + \omega_1 t\right)$$

+ same terms with $\omega_1 \rightarrow \omega_2\}$, where $\beta$ is a constant of proportionality and Green's function $\tilde{G}$ has now been written in the form:

$$\tilde{G}(x,0) = |\tilde{G}| \exp(ik|x| + i\phi_{atm}), \quad (13)$$

where $\phi_{atm}$ is the atmospheric phase distortion. It may be assumed that the receiving telescope 101 has a small enough aperture that $\phi_{atm}$ does not vary appreciably across this aperture. Similarly, the current output $i_{p+s}$ of heterodyne detector 112 as at 114 is proportional to the product of the real part of the expression:

$$e_{p+s} U_{p+s}(x) (\exp[i(\omega_o+\omega_1)t] + \exp[i(\omega_o+\omega_2)t]), \quad (14)$$

and the argument $\cos(\omega_0 t)$.

Using equation (9) may obtain:

$$i_{p+s}(x) = \beta |\tilde{G}| \{\cos(k|x| + \phi_{atm}(x) + \omega_1 t) \quad (15)$$

$$+ \int dx' |u(x')| \rho(x') |$$

$$\times \cos\left(k|x| + \phi_{atm}(x) - k\frac{x \cdot x'}{|x|} + \omega_1 t\right)$$

+ same terms with $\omega_1 \rightarrow \omega_2\}$.

Equation (15) therefore respresents the output 114 of detector 112 and hence the input to squaring circuit 116. Likewise a similar expression represents output 113 of detector 111 and hence an input to squaring circuit 115.

Note the $i_{p+s}(x)$ and $i_{p-s}(x)$ are the same except that the sign of the terms involving the integral are different. Hence, if we square $i_{p+s}$ and $i_{p-s}$ and subtract the results, the only terms remaining will be those involving cross product terms having the form:

$$\cos(k|x| + \phi_{atm}(x) + \omega_j t) \int dx' |u(x') \rho(x')| \quad (16).$$

$$\cos\left(k|x| + \phi_{atm}(x) - k\frac{x \cdot x'}{|x|} + \omega_j t\right) i = 1,2; j = 1,2.$$

If we multiply the remaining terms by $\cos(\omega_1 - \omega_2)t$ or $\sin(\omega_1 - \omega_2)t$ and integrate over a time large compared with $(\omega_1 - \omega_2)^{-1}$, all terms not at the difference frequency $(\omega_1 - \omega_2)$ integrate to zero. Thus, the output at 117 of squaring device 115 is proportional to $$-|\tilde{G}|^2 \int dx' |u(x') \rho(x')| \left[ \cos\left(\frac{k x \cdot x'}{|x|}\right) \cos(\omega_1 - \omega_2)t \right. \quad (17)$$

$$\left. + \sin\left(\frac{k x \cdot x'}{|x|}\right) \sin(\omega_1 - \omega_2) \right]$$

$$+ \left\{ \begin{array}{c} \text{terms that average to zero or are} \\ \text{cancelled by the subsequent subtrac-} \\ \text{tion process} \end{array} \right\}.$$

and output 118 of squaring device 116 is equal to the negative of the first term in equation (17) plus terms that average to zero or are cancelled by the subsequent subtraction process. Squaring devices 115 or 116 may be of the square law detector type or the like.

Multiplication of the integral in equation (17) by $\cos(\omega_1 - \omega_2)t$ and integration over a time long compared with $(\omega_1 - \omega_2)$ yields a result that is proportional to the real part of the Fourier transform of the field diffusely reflected from the scatterer. Likewise, multiplication of the integral in equation (17) by $\sin(\omega_1 - \omega_2)t$ and integration over a time long compared with $(\omega_1 - \omega_2)$ yields a result that is proportional to the imaginary part of the Fourier transform of the field diffusely reflected from the scatterer. To illustrate the implementation of this process in the receiver as in the figure, the following occurs;

Multiplication by $\cos(\omega_1 - \omega_2)t$ is performed by the mixers 120 and 121. Multiplication by $\sin(\omega_1 - \omega_2)t$ is performed by the mixers 129 and 130. The signal $\cos(\omega_1 - \omega_2)t$ is provided directly by local oscillator 119 as input to mixers 120 and 121. The signal $\sin(\omega_1 - \omega_2)t$ is provided by passing the output of 119 through a ninety degree phase shifter at 128 to mixers 129 and 130. The subtraction required to cancel some of the terms within the curly brackets in equation (17) is performed by subtracting circuits 124 and 133. Circuit 124 has inputs from mixers 120 and 124 at 122 and 123. Circuit 133 has inputs from mixers 129 and 130 at 131 and 132. The time averaging required to average to zero terms not at the frequency $(\omega_1 - \omega_2)$ is performed by low pass filter 126 receiving the signal input at 125 from subtractor circuit 124. Likewise, low pass filter 135 receives inputs at 134 from subtracting circuit 133. Points 125 and 134 are therefore the first points in FIG. 1 where the distortion component due to the atmosphere has been eliminated.

In summary, it has been shown that the output of low pass filter 126 at 127 is proportional to the function $$|\tilde{G}|^2 \int dx' |u(x')| \rho(x') \cos\left(\frac{k\,\underline{x}\cdot\underline{x}'}{|x|}\right) \quad (18),$$

which is $|\tilde{G}|^2$ times the real part of the Fourier transform of the field diffusely reflected from the scatterer, and the output of low-pass filter 135 at 136 is proportional to the function $$|\tilde{G}|^2 \int dx' |u(x')| \rho(x') \sin\left(\frac{k\,\underline{x}\cdot\underline{x}'}{|x|}\right) \quad (19),$$

which is $|\tilde{G}|^2$ times the imaginary part of the Fourier transform of the field diffusely reflected from the scatterer. In most cases it will not be necessary to determine the quantity $|\tilde{G}|^2$ since it will be nearly equal for all of a plurality of receivers such as 100, in an array thereof. However, if necessary we can easily determine $|\tilde{G}|$ by summing the currents $i_{p-s}$ as at 113 and $i_{p+s}$ as at 114, to obtain [from equations (12) and (15)]:

$$i_{p-s}(x) + i_{p+s}(x) = 2\beta\,|\tilde{G}|\,[\cos(k|x| + \phi_{atm}(x) + \omega_1 t) + \cos(kx + \phi_{atm}(x) + \omega_2 t)] \quad (20)$$

The simplest way to obtain $|\tilde{G}|$ is to pass the sum current $i_{p-s} + i_{p+s}$ through a square law detector followed by a low pass filter as above discussed. Hence the DC part of $(i_{p-s} + i_{p+s})^2$ will be proportional to $|\tilde{G}|^2$.

The signal at 127 is therefore an input to A/D converter 137 for handling REAL components, and the signal at 136 is an input to A/D converter 138 for handling IMAGINARY components. Multiplexer circuit 139 being connected to outputs of converters 137 and 138 provides an input to a digital computer at 140′ such as IBM Model 360. A suitable computer 140 program preferably in FORTRAN IV language is provided as input to computer 140, to process data coming from the multiplexer. CRT play 141 connected to output of computer 140 is provided in order to display signals received from an array of receivers, such as 100 herein.

The output of multiplexer 139 at 139′ is the input to digital computer 140 which represents the last point in the receiving system where signals, in direct Fourier transform format less atmospheric distortion component as shown by expression (13), are inputted to the digital computer 140 for performing inverse Fourier transformation by the computer and for displaying the inverse transformed signal on a CRT tube, for example, by applying output of computer 140a to intensity modulation axis (Z-axis) of the CRT.

An image of the scatterer (the object in space) can be obtained by utilizing a number of receivers of the type shown in FIG. 1 at 100 at different points x, i.e., an array of receivers is utilized, instead of one receiver. The desired image is then obtained by performing numerically an inverse Fourier transform of the data values supplied by the receiver array. Contrary to conventional imaging techniques which would require that the array elements be spaced with wavelength tolerances, the technique described here allows us to use an array in which the receiver spacing tolerances are much less stringent. The reason for this is that each receiver in the array is self-referencing because of the way in which the receivers process the signal. An uncertainty $\Delta x$ in the spacing between array elements leads simply to an uncertainty in the image Fourier transform variable.

$$\delta K = \frac{k}{|x|} \Delta x \quad (21).$$

The smallest increment in spatial wavenumber observed at the receiver is that corresponding to the largest dimension of the object, where $L_o$ in equation (2⁀) represents said largest dimension.

$$\delta K \geq \frac{2\pi}{L_o} \quad (22).$$

Hence the uncertainty in $x$ is unimportant if $$\delta K = \frac{k}{|x|} \Delta x << \frac{2\pi}{L_o} \quad (23),$$

which yields the condition $$\Delta x << \frac{\lambda}{(L_o/|x|)} = \frac{\lambda}{\theta_{object}} \quad (24).$$

But $\theta_{object} << 1$, as expressed in radians, for all cases of interest, so that the tolerances for the contemplated array always greatly exceed $\lambda$, thereby making spacing between receivers, such as 100 of the array, unimportant and not critical. $\theta_{object}$ should not be confused with angle 105 illustrated in FIG. 1, as the incident beam angle for one receiver 100 with respect to plane 104 that is normal to polarizer 103.

It should be noted, that all components illustrated in FIG. 1 and discussed herein are individually available and known in the art, and it is their combination and use to obtain unusual benefits that is significant.

Figure 2:
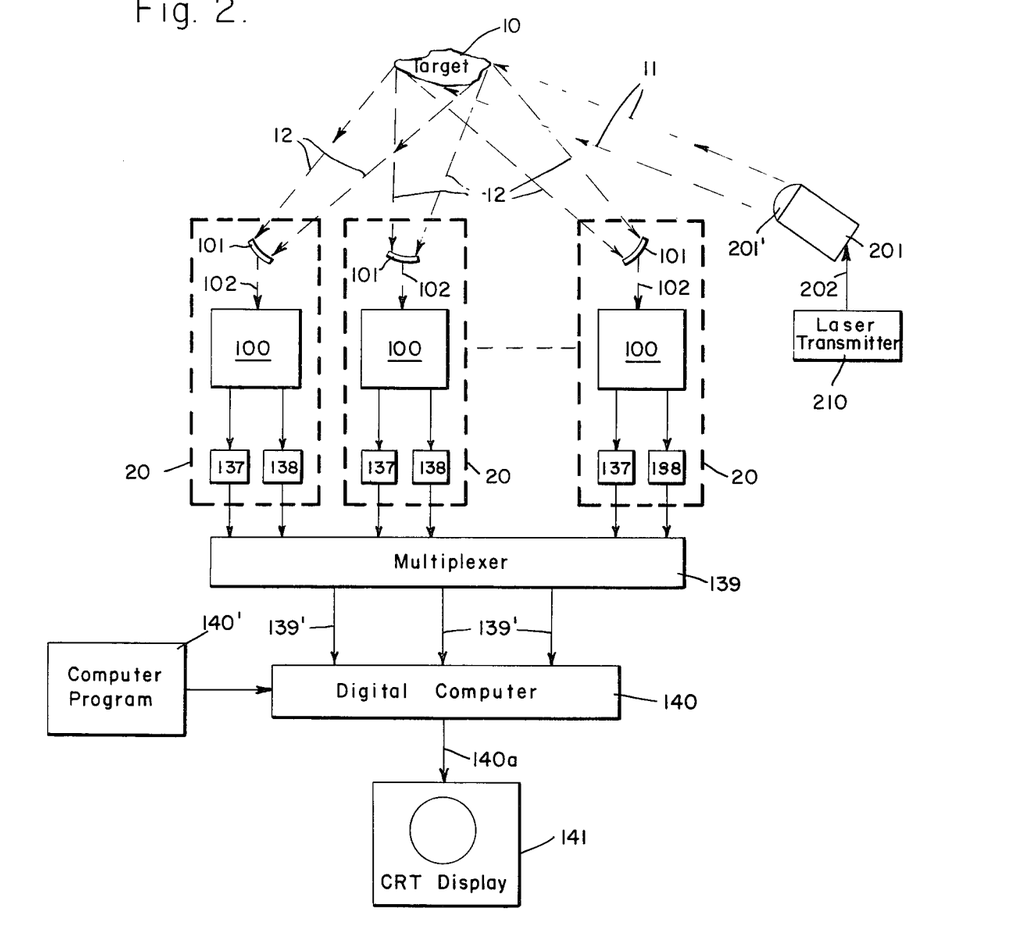
FIG. 2 schematically shows a plurality of dual channel receivers as in FIG. 1 and a transmitting system illuminating a target with the plurality of receiving systems receiving reflected energy from the target differently weighted.

It should be understood, that although FIG. 1 does not show a transmitter providing an electromagetic source of energy to illuminate the target (scatterer), that such transmitter source is part of the system described herein, and as shown in FIG. 2, discussed hereinbelow.

As stated above, all components shown in the drawings are standard in the art, however to aid in the practice of this invention certain of the more complex components are referenced as follows:

Heterodyne Detectors 111 and 112 are shown in "Laser Communication Systems," by W. K. Pratt, page 38.

Squaring Circuits 115 and 116 are shown in "Sourcebook of Electronic Circuits," by John Markus, McGraw Hill, N.Y., page 267.

Ninety-Degree Phase Shifter 128 is shown in "Sourcebook of Electronic Circuits", by John Markus, McGraw Hill, N.Y., page 653 (400 CPS Operation), modified to utilize frequency used in instant application.

Subtracting Circuits 124 and 133 may be obtained by using any operational amplifier known in the art which will perform this function.

Low Pass Filters 126 and 135 are filters known in the art. For use in the instant application a frequency response from zero to one kilohertz will provide the range of filtering necessary.

Beam Splitter 103 is shown in "Applied Optics," by L. Levi, John Wiley & Sons, N.Y. (1968), page 343. An optical beam splitter conventional in the art may be used. However, a Wire Grid Polarizer for 10.6μm Radiation discussed in "Digest of Papers" published jointly by IEE Quantum Electronics Council and Optical Society of America in 1973 IEEE OSA Conference on Laser Engineering and Applications, May 30 - June 1, 1973 at Washington, D. C., pages 100–101, may be used.

Ninety-Degree Polarization Rotator 110' is commercially available at Two-Six Co., 207 Garden Lane, Glen Shaw, Pa. 15116, referred to as One-Half-Wave Plate.

Figure 3:
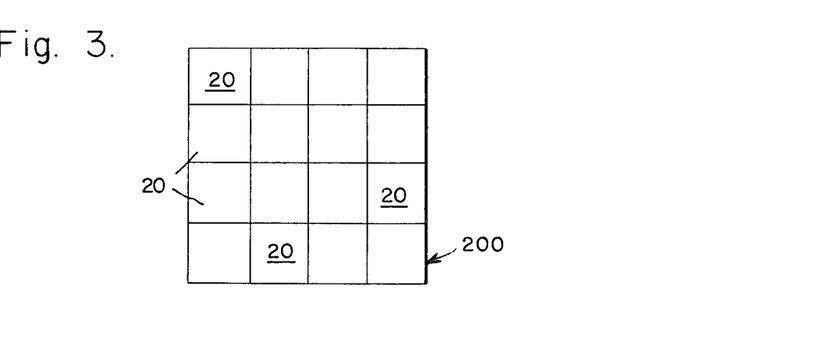
FIG. 3 shows in block form a matrix of receiving systems illustrated in FIG. 2.

Referring to FIGS. 2 and 3, a matrix of receiving systems 20 are shown at 200, Though matrix 200 is shown for illustration purposes as a 4×4 array of receiving systems 20, such array may be of the $n \times m$ matrix where $n$ and $m$ are any digits representing the number of rows and columns of receiving systems 20 desired, or the array does not have to be structured in rows and columns since the reclined images from each system 20 are the total images representing the target with different weighting factors.

Each receiving system 20 is comprised of optical sensor or telescope 101, receiver 100, and A/D converters 137 and 138. A common multiplexer 139 for switching between converter sets 137 and 138 is used and for switching between each set of converters. Digital computer 140 receives outputs at 139' from the common multiplexer 139 in a predetermined sequence until all outputs of receiving systems 20 as in FIG. 3 have been inputted to computer 140 to process the real and imaginary components that have been A/D converted by each converter 137–138, where computer 140 inverse transforms the digital signals to obtain the spatial distribution on display 141 of the image field of target 10 from which the image is obtained.

Transmitter 210, generally of the laser type, provides an optical output at 202 to transmitting telescope 201. Telescope 201 has a lens 201' through which the transmitted beam 11 passes, to fully illuminate a target at 10 of a preselected area. Generally the characteristics of a laser beam are spatially and temporally coherent. There is very little beam 11 divergence or spread. Since it is desired to illuminate an entire target area most of the time, a lens as at 201' will be provided to spread or diverge the beam more than its natural spread angle to enable full target illumination of preselected target areas. The transmitter system will provide target illumination beam 11 that is polarized.

Each of beams 12 will therefore be reflected from target 10 to impinge on the face of each receiving telescope 101 for each receiving system 20. Bean 12 will contain all optical components of beam 11, which may be defined as polarized energy and cross-polarized energy, the latter energy due to diffuse scattering of energy occuring at the face of the target. Each system 20 will then function as described in conjunction with FIG. 1, above.

Insofar as elimination of distortion components are concerned, such distortion components being given by equation (13), where $|\tilde{G}|$ is the amplitude distortion portion, $\exp(_k|x|)$ is a number representing a linear phase shift across receiving systems 20 of array 200, and $\exp(i\phi_{atm})$ represents the phase distortion component which is the major component in the total distortion $\tilde{G}(x,o)$ due to atmospherics that have been eliminated by each receiver 100. Component $\tilde{G}(x,o)$ is shown in equation (6) which is the electromagnetic far-field expression in Fourier transform notation of the total received electromagnetic wave at each receiver 100 input, or course including the objectionable distortion component $\tilde{G}(x,o)$ which each receiver 100 eliminates by methods heretofore described.

It should be noted that spacing between target 10 and telescopes 101 may be in the order of 40,000 kilometers, and thus fields represented by beams 12 may be considered as far-fields since the receiving telescopes are a substantial distance from the target or scatterer 10. It is well recognized in the art of electromagnetic theory that such far-fields received at 101 is more exactly expressed in terms of the direct Fourier transform as a function of spatial separation from the scatterer and the receivers.

With respect to equation (6), the distortion components $G(x,o)$ will have been removed when the multiplexed signal at 139' containing the real and imaginary component pairs which are handled by computer 140 which inverse transforms such signal pairs from the complex domain. Such inverse Fourier transformed signals at 140a are applied to the Z or intensity axis of CRT display 141 to reconstruct the configurtion of target 10 by evaluating the weighting factors of different shades of white, black or gray seen by each system 20.

The far-field at the input to each receiving system can be seen in complex form (direct Fourier transform) in equation (6). Integration over total surface of target 10 is seen to occur by symbolic nutation $\int_{x'}$. The reflectivity coefficient or factor of target 10 is denoted by $\rho(x')$. The field at 12 reflected from target 10 may also be simply stated as being the incident field 11 from the illuminating transmitter multiplied by the reflectivity coefficient. Expression (6) shows the weighting factor, a variable, as exp $$\left[ -ik \frac{x \cdot x'}{|x|} \right],$$

where $x$ represents the position of each receiving system 20 in the array, and $x'$ represents any point on the target 10, remembering that the entire target is illuminated and that each receiving system 20 receives a reflected beam covering all points of area of target 10. Thus each receiving system will have a different weighting factor, and the combined inputs of receiving beams 12 are converted by computer 140 to reconstruct the shape and shades of black, gray and white of target 10, when a matrix such as 200 of receiving systems 20 are utilized.

The computer program utilized is one of the known and published programs in International Business Machine Corp. (IBM) Applications Program (Bulletin GH20-0205-1) for System/360 Scientific Package, Version III of Programmer's Manual for program number 360A-CM-03X, tailored for the FORTRAN language. Within this Program Package, which is the Fifth Edition published August 1970, the subroutine HARM is the program used. The HARM subroutine provides capability slightly in excess of the requirements herein in that it supplies solutions for inverse Fourier transformation by the computer when a three dimensional array is used. Here we have only a two dimensional array, and consequently when the data comprising parameters of two dimensional array are inputted, no data will be provided for the third dimension in which case the computer program HARM at 140' will treat the absence of the third dimensional value as zero, and a true construction of the image on display 141 will result. The HARM program is found in the referenced manual at pages 276-279.

It should be noted that most computers have a memory limited in the number of bits of information or words stored therein. In such case the IBM Systems 360 are provided with auxiliary storage capability to take the overflow of information that cannot be stored in the memory within the computer. The auxiliary storage means transfers the data stored therein to the memory in the computer as the computer-stored data is utilized. In this regard the auxiliary system employs memory storage and shift register banks, all known in the art.

CRT display of 141 for constructing various shades of black, gray and white to receive computer inputs thereto as at 140a by techniques self-contained and used therein are well kown in the art. Among the variety of displays 141 made are Princeton Model 801 Graphic Computer Terminal, Instruction 008-2, Issue 1-303, Part No. 18001-0014, made by Princeton Electronic Products, Inc. of North Brunswick, N.J. Another such display tailored to IBM systems 360 computers is made under the trade name of ANAGRAPH by Data Disk of Sunnyvale, Calif. Still another disply 141 is made under the trade name of Conographics-12, by Huges Aircraft Company, Industrial Products Division, Oceanside, Calif.

I claim:

1. A polarization reference imaging system having a transmitter and receiver, said receiver having a pair of channels, comprising the combination:
   a pair of squaring circuits, one of said squaring circuits as in integral part of each said channel;
   a pair of mixing circuits electrically connected to each of the squaring circuits; and
   a pair of subtracting circuits electrically connected to the mixing circuits.

2. The invention as stated in claim 1, including:
   a first heterodyne detector and a second heterodyne detector feeding said squaring circuits.

3. The invention as stated in claim 2, including:
   a first local oscillator and an angular polarization rotator serially interconnected, the first local oscillator being connected to the first heterodyne detector and the rotator being connected to the second heterodyne detector.

4. The invention as stated in claim 3, including:
   a polarizing member feeding said heterodyne detectors for dividing an incoming electromagnetic wave into two components; and
   a mirror optically coupled to the polarizing member for reflecting one of the two components so that said one of the two components excites the first heterodyne detector, the other of said two components being transmitted through the polarizing member for exciting the second heterodyne detector.

5. The invention stated in claim 4, wherein the pair of mixing circuits comprises:
   a first mixer circuit, the input of which is connected to the output of a first of the squaring circuits; and
   a second mixer circuit, the input of which is connected to the output of a second of the squaring circuits.

6. The invention as stated in claim 5, including:
   a second local oscillator, outputs of which are each connected respectively to inputs of the first and second mixer circuits.

7. The invention as stated in claim 6, including:
   a phase shifter the input of which is connected to an output of the second local oscillator.

8. The invention as stated in claim 7, including:
   a first low pass filter connected to the output of a first of the pair of subtracting circuits; and
   a second low pass filter connected to the output of a second of the pair of subtracting circuits.

9. Polarization reference imaging means, comprising in combination:
   a first heterodyne detector and a second heterodyne detector;
   a first squaring circuit electrically connected to the output of the first detector, and a second squaring circuit electrically connected to the output of the second detector;
   a first local oscillator and an angular polarization rotator serially interconnected, the first local oscillator being connected to the first detector and the rotator being connected to the second detector;
   a polarizing member optically coupled to said detectors that divides an incoming electromagnetic wave into two components;
   a mirror optically coupled to said polarizing member for reflecting one of the two components so that said one of the two components excites the first detector, the other of said two components being transmitted through the polarizing member for exciting the second detector;
   a first mixer circuit, the input of which is connected to the output of the first squaring circuit;
   a second mixer circuit, the input of which is connected to the output of the second squaring circuit;
   a second local oscillator outputs of which are each connected respectively to inputs of the first and second mixer circuits;
   a phase shifter the input of which is connected to an output of the second local oscillator;
   a third mixer circuit, the input of which is conneced to the output of the first squaring circuit;
   a fourth mixer circuit, the input of which is connected to the output of the second squaring circuit;
   a first subtracting circuit, the inputs of which are connected to outputs from the first and second mixer circuits;
   a second subtracting circuit, the inputs of which are connected to outputs from the third and fourth mixer circuits;
   a first low pass filter connected to the output of the first subtracting circuit;
   a second low pass filter connected to the output of the second subtracting circuit;
   a first analog to digital converter connected to the output of the first low pass filter for converting REAL components of analog electrical outputs from the first low pass filter to digital format; and
   a second analog to digital converter connected to the output of the second low pass filter for converting IMAGINARY components of analog electrical outputs from the second low pass filter to digital format.

10. The invention as stated in claim 9, including:
    a multiplexer circuit connected to outputs of the analog to digital converters for providing periodic switching action between the first and second analog to digital converters.

11. The invention as stated in claim 10, including:
    a plurality of said polarization reference means; and a digital computer, connected to the output of the multiplexer circuit, for processing information received thereby.

12. The invention as stated in claim 14, including:
a visual display terminal, connected to the output of the digital computer, for reconstructing and displaying an image represented by said information.

13. The invention as stated in claim 31, including the steps of:
reflecting a first component of the received signals from a mirrored surface for processing by a first of said channels, and transmitting a second component of said received signals for processing by a second of said channels prior to the step of squaring; and
detecting the first and second components of the signals.

14. The invention as stated in claim 13, including the steps of:
beating the first signal component with output from a laser oscillator, and beating the second signal component with a polarized and angularly shifted signal output of the laser oscillator, the steps of beating preceding the step of detecting.

15. The invention as stated in claim 14, including the steps:
mixing the output of a first of the squaring circuits with a local oscillator and mixing the output of a second of the squaring circuits with said local oscillator; and
feeding the mixed output to a phase shifter.

16. The invention as stated in claim 15, including the steps:
mixing the output of the first squaring circuit with the phase shifter; and
mixing the output of the second squaring circuit with the output of said phase shifter.

17. The invention as stated in claim 16, including the steps of:
feeding the mixed output of the local oscillator and first squaring circuit into a first of the subtracting circuits; and
feeding the mixed output of the local oscillator and second squaring circuit into said first subtracting circuit.

18. The invention as stated in claim 17, including the steps of:
subtracting the signals fed into a first of the substracting circuits; and
passing the output of the first subtracting circuit through a first low pass filter.

19. The invention as stated in claim 18, including the steps of:
feeding the mixed output of phase shifter and first squaring circuit into a second of the subtracting circuits; and
feeding the mixed output of the phase shifter and second squaring circuit into said second subtracting circuit.

20. The invention a stated in claim 19, including the steps of:
passing the signals, as defined by the second stated mixing step, into a second subtracting circuit; and
passing the output of the second subtracting circuit through a second low pass filter.

21. A method for processing information received by an optical signal receiving means having a first and a second channel, comprising the steps of:
reflecting a first component of the signal from a mirrored surface for processing by the first channel, and transmitting a second component of the signal for processing by the second channel;
beating the first signal component with output from the laser oscillator, and beating the second signal component with a polarized and angularly shifted signal output of the laser oscillator;
detecting the first and second components of the signal;
mixing the output of the first squaring circuits with a local oscillator and mixing the output of the second squaring circuit with said local oscillator;
feeding the local oscillator output to a phase shifter;
mixing the output of the first squaring circuit with the phase shifter;
mixing the output of the second squaring circuit with the output of said phase shifter;
feeding the mixed phase shifted and non-phase shifted signals into a first subtracting circuit;
feeding the mixed phase shifted and non-phase shifted signals into a second subtracting circuit;
subtracting the signals fed into the first and second subtracting circuits;
passing the signals fed to the first subtracting circuit through a first low pass filter; and
passing the signal fed to the second subtracting circuit through a second low pass filter;
feeding the output of the first low pass filter into an analog to digital converter for passing therethrough the REAL component of the converted signal; and
feeding the output of the second low pass filter into an analog to digital converter for passing therethrough the IMAGINARY component of the converted signal.

22. The invention as stated in claim 21, including the step of:
periodically switching the REAL and IMAGINARY components by feeding same into a multiplexer.

23. The invention as stated in claim 22, including the steps of:
feeding the multiplexer output as input data to a digital computer.

24. The invention as stated in claim 23, including the steps of:
displaying data processed by said computer.

25. A polarization reference imaging system having a transmitter and receiver, comprising the combination of:
a pair of channels as integral portions of the receiver, said system being devoid of direct transmitter to receiver interconnection;
a pair of squaring circuits, one of said squaring circuits as an integral part of each said channel; and
a pair of subtracting circuits electronically coupled to the squaring circuits.

26. A method for polarization reference imaging receiving of signals, utilizing a system having a pair of receive channels, comprising in combination the steps of:
squaring the signals received by each of the receive channels; and
subtracting the squared signals from each other.

* * * * *

UNITED STATES PATENT AND TRADEMARK OFFICE
CERTIFICATE OF CORRECTION

PATENT NO. : 4,044,247
DATED : August 23, 1977
INVENTOR(S) : Wilbur P. Brown, Jr.

It is certified that error appears in the above—identified patent and that said Letters Patent are hereby corrected as shown below:

Claim 12, line 1, column 13 should read:

12. The invention as stated in claim 11, including:

Claim 13, line 1, column 13 should read:

13. The invention as stated in claim 26, including the

Signed and Sealed this

Fourth Day of July 1978

[SEAL]

Attest:

RUTH C. MASON
Attesting Officer

DONALD W. BANNER
Commissioner of Patents and Trademarks